(12) United States Patent
Wiedmann et al.

(10) Patent No.: US 11,898,599 B2
(45) Date of Patent: Feb. 13, 2024

(54) FOIL BEARING

(71) Applicant: Robert Bosch GmbH, Stuttgart (DE)

(72) Inventors: Felix Wiedmann, Offenbach an der Queich (DE); Felix Foerster, Maulbronn (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 17/637,006

(22) PCT Filed: Jun. 12, 2020

(86) PCT No.: PCT/EP2020/066316
§ 371 (c)(1),
(2) Date: Feb. 21, 2022

(87) PCT Pub. No.: WO2021/037412
PCT Pub. Date: Mar. 4, 2021

(65) Prior Publication Data
US 2022/0290716 A1 Sep. 15, 2022

(30) Foreign Application Priority Data

Aug. 28, 2019 (DE) .................... 10 2019 212 919.6

(51) Int. Cl.
*F16C 17/02* (2006.01)

(52) U.S. Cl.
CPC .................. *F16C 17/024* (2013.01)

(58) Field of Classification Search
CPC ................................................. F16C 17/024
See application file for complete search history.

(56) References Cited

U.S. PATENT DOCUMENTS

| | | | |
|---|---|---|---|
| 7,186,026 B2 * | 3/2007 | Nagata | F16C 17/024 |
| | | | 384/106 |
| 9,376,959 B2 * | 6/2016 | Yoshino | F16C 17/024 |
| 10,155,290 B2 | 12/2018 | Beers et al. | |
| 2015/0292552 A1 | 10/2015 | Thompson et al. | |

FOREIGN PATENT DOCUMENTS

| | | |
|---|---|---|
| EP | 0927831 A1 | 7/1999 |
| EP | 2314878 A1 | 4/2011 |

OTHER PUBLICATIONS

Translation of International Search Report for Application No. PCT/EP2020/066316 dated Sep. 25, 2020 (2 pages).

* cited by examiner

*Primary Examiner* — James Pilkington
(74) *Attorney, Agent, or Firm* — Michael Best & Friedrich LLP

(57) ABSTRACT

A foil bearing (10) having at least one foil (16, 18) which is arranged and fixed in place inside a bearing bore (14) of a bearing support (12). The bearing support (12) is made of aluminum or an aluminum alloy, and the surface of the bearing bore (14) is provided at least in one contact region (20) of the at least one foil (16, 18) with a hard material layer (26). The bearing support (12) can be produced in a simple and cost-effective manner, has a low weight and a good thermal conductivity.

11 Claims, 2 Drawing Sheets

FOIL BEARING

BACKGROUND OF THE INVENTION

The invention relates to a foil bearing having at least one foil arranged and fixed within a bearing bore of a bearing receptacle.

Such a foil bearing is disclosed by EP 0 927 831 A1. This foil bearing comprises a bearing receptacle that is in the form of a bearing sleeve and has a bearing bore, within which is arranged at least one foil which is fixed in the bearing sleeve. The at least one foil is supported in the bearing bore on the bearing sleeve, the bearing sleeve usually being produced from steel in order to avoid wear in the region of contact with the foil. The bearing sleeve can be installed in a housing of a compressor, which can comprise a shaft mounted in the foil bearing and at least one compressor wheel connected to the shaft. The housing of the compressor can be produced from aluminum or an aluminum alloy. The processing of the bearing sleeve produced from steel is complex, and expensive as a result. Moreover, the bearing sleeve produced from steel has a high weight and relatively poor thermal conductivity, with the result that the removal of heat from the foil bearing is made more difficult.

SUMMARY OF THE INVENTION

The invention provides a foil bearing wherein the bearing receptacle is produced from aluminum or an aluminum alloy. The foil bearing according to the invention has the advantage that the bearing receptacle is easy to process, has a low weight and good thermal conductivity, and therefore the foil bearing can be produced cost-effectively and its weight is low and the removal of heat from the foil bearing is improved.

Advantageous configurations and refinements of the invention are specified in the dependent claims.

The design according to one embodiment of the invention ensures sufficient wear resistance of the bearing receptacle. The design according to one embodiment of the invention allows the formation of an oxide layer on the surface of the bearing bore, which has increased wear resistance. The formation of the hard-material layer according to one embodiment of the invention from titanium nitrite likewise enables sufficient wear resistance. The design according to one embodiment of the invention makes it possible to incorporate the bearing receptacle into the housing of a compressor, with the result that a separate bearing sleeve is not required.

BRIEF DESCRIPTION OF THE DRAWINGS

Further advantages, features and details of the invention will become apparent from the following description, which describes an exemplary embodiment in detail with reference to the drawing.

An exemplary embodiment of the invention is illustrated in the drawing and explained in more detail in the following description.

DETAILED DESCRIPTION

Figure 1:
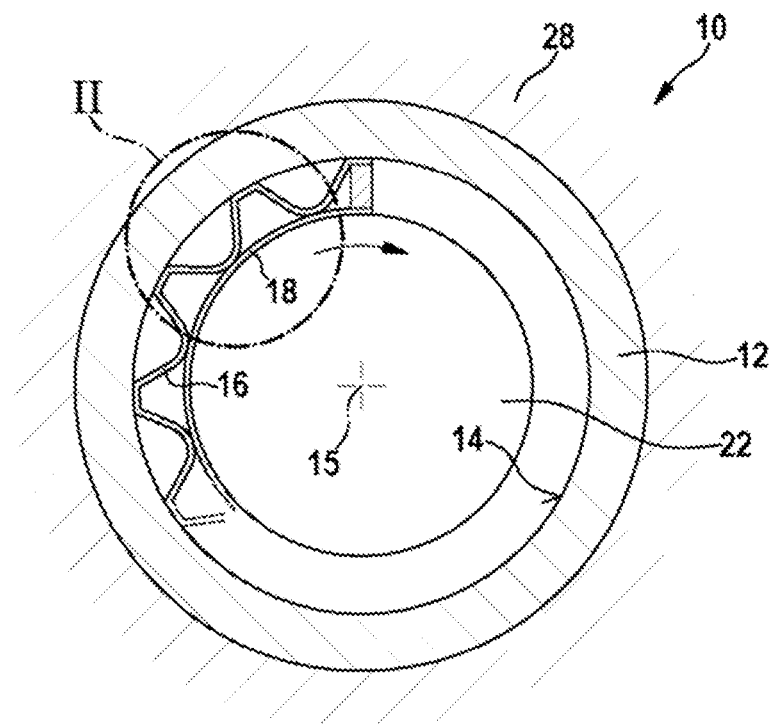
FIG. 1 shows a cross section of a foil bearing having a bearing receptacle and foils arranged therein.
Figure 2:
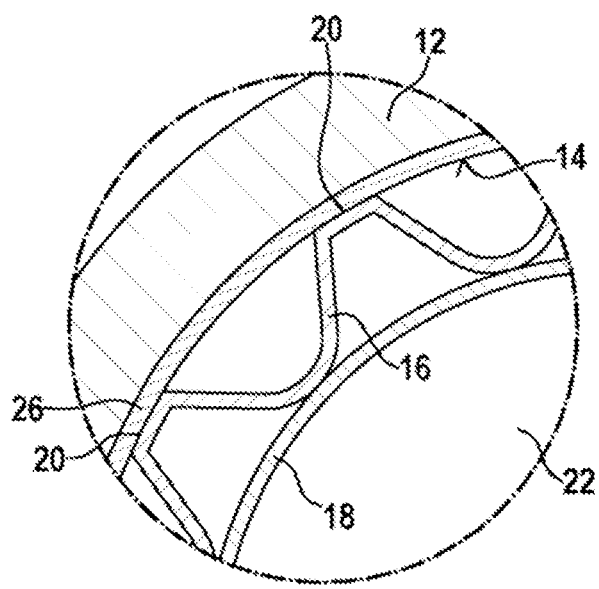
FIG. 2 shows an enlarged illustration of a detail II of the bearing receptacle and FIG. 3 shows a detail of a housing of a compressor with a foil bearing arranged therein.
Figure 3:
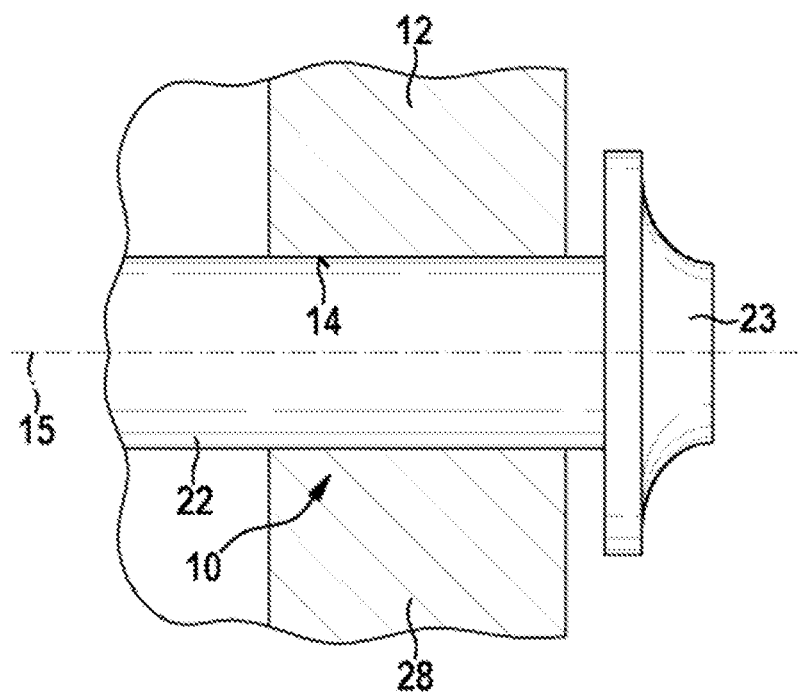

FIGS. 1 to 3 illustrate a foil bearing 10 having a bearing receptacle 12, which may be in the form of a bearing sleeve. The bearing sleeve 12 has substantially the shape of a straight, hollow circular cylinder having a bearing bore 14 and a longitudinal axis 15. Two foils 16, 18 of the foil bearing 10 are arranged inside the bearing bore 14, for example. The foil 16 is also referred to as beam foil, bump foil or bottom foil and is arranged between the bearing bore 14 and the foil 18, which is also referred to as top foil or upper foil. The foil 16 is in the form of a spring foil, for example, and bears against the bearing bore 14 at least in certain regions in contact regions 20. In FIG. 1, the foils 16, 18 are illustrated only in a part of their circumference and extend over the entire circumference of the bearing bore 14. The foil bearing 10 serves for the rotatable mounting of a shaft 22, which bears against the foil 18. When the shaft 22 is rotating, a gas cushion forms between the shaft 22 and the foil 18.

The foils 16, 18 are in the form of metal foils and may be produced by punching. A third foil may also be arranged between the two foils 16, 18. The foils 16, 18 are fixed in the bearing bore 14 of the bearing receptacle 12 in a way which is not illustrated in more detail. For example, the foils 16, 18 may be inserted by way of their circumferentially pointing edges resulting in a T-shaped retention or into slits or openings in the inner lining of the bearing bore 14.

The bearing receptacle 12 is produced from aluminum or an aluminum alloy, the bearing bore 14 being processed by a machining method or another method, such as erosion for example, in order to obtain sufficient accuracy in terms of shape and dimensions. In order to ensure sufficient wear resistance of the bearing receptacle 12, the surface of the bearing bore 14 is provided with a hard-material layer 26.

The hard-material layer 26 may be formed for example by anodizing the surface of the bearing bore 14. This is an electrolytic method in which there is formed from the aluminum or the aluminum alloy an oxide layer that has higher wear resistance than the aluminum or the aluminum alloy. As an alternative, the hard-material layer 26 may also be formed by applying a coating of titanium nitrite TiN to the surface of the bearing bore 14.

Preferably, after the hard-material layer 26 has been applied, processing of the bearing bore 14 is effected again in order to also obtain the required accuracy in terms of shape and dimensions with the hard-material layer 26.

The shaft, which is rotatably mounted in the foil bearing 10, belongs for example to a rotor (which is likewise not illustrated) of a turbomachine. The turbomachine is for example part of an air supply unit in a fuel cell system. In the fuel cell system, the turbomachine is designed as a compressor, for example. The compressor comprises a compressor wheel 23, which is an advantageous constituent part of the rotor.

The bearing receptacle 12 may, as stated above, be a separate component in the form of a bearing sleeve, which is inserted in a housing part of the compressor. As an alternative, the bearing receptacle 12 may also be part of a housing part 28 of the compressor, that is to say may be formed in one piece with the housing part 28. In this respect, the bearing bore 14, which comprises the hard-material layer 26 as explained above, is introduced in the housing part 24.

By virtue of the bearing receptacle 12, effective dissipation of heat produced in the foil bearing 10 is enabled on account of the good thermal conductivity of the aluminum or the aluminum alloy.

What is claimed is:
1. A foil bearing (10) comprising:
a bearing receptacle (12) defining therein a bearing bore (14); and at least one foil (16, 18), which is arranged within the bearing bore (14) and fixed therein, wherein the bearing receptacle (12) is produced from aluminum or an aluminum alloy, wherein a surface of the bearing bore (14) of the bearing receptacle (12) is provided with a hardened layer (26) at least in a region (20) of contact with the at least one foil (16, 18).

2. The foil bearing as claimed in claim 1, wherein the hardened layer (26) is formed by anodizing the surface of the bearing bore (14) of the bearing receptacle (12).

3. The foil bearing as claimed in claim 1, wherein the hardened layer (26) is formed from titanium nitrite.

4. The foil bearing as claimed in claim 3, wherein the bearing receptacle (12) is part of a housing part (28) of a compressor.

5. The foil bearing as claimed in claim 3, wherein the bearing receptacle (12) is in a form of a bearing sleeve.

6. The foil bearing as claimed in claim 5, wherein the foil bearing (10) comprises at least one top foil (18) and one bottom foil (16), which is arranged between the at least one top foil (18) and the bearing bore (14), wherein at least the bottom foil (16) bears against the bearing bore (14).

7. The foil bearing as claimed in claim 1, wherein the bearing receptacle (12) is part of a housing part (28) of a compressor.

8. The foil bearing as claimed in claim 1, wherein the bearing receptacle (12) is in a form of a bearing sleeve.

9. The foil bearing as claimed in claim 1, wherein the foil bearing (10) comprises at least one top foil (18) and one bottom foil (16), which is arranged between the at least one top foil (18) and the bearing bore (14), wherein at least the bottom foil (16) bears against the bearing bore (14).

10. The foil bearing as claimed in claim 1, wherein the bearing receptacle (12) is produced from aluminum.

11. The foil bearing as claimed in claim 1, wherein the bearing receptacle (12) is produced from aluminum alloy.

\* \* \* \* \*